United States Patent
Hou (10) Patent No.: US 8,872,393 B2
(45) Date of Patent: Oct. 28, 2014

(54) VOICE COIL MOTOR

(71) Applicant: Tricore Corportion, Chang Hua County (TW)

(72) Inventor: Jen-Chieh Hou, Ghanghua County (TW)

(73) Assignee: Tricore Corporation, Chang Hua County (TW)

( * ) Notice: Subject to any disclaimer, the term of this patent is extended or adjusted under 35 U.S.C. 154(b) by 227 days.

(21) Appl. No.: 13/647,696

(22) Filed: Oct. 9, 2012

(65) Prior Publication Data
US 2014/0097707 A1   Apr. 10, 2014

(51) Int. Cl.
*H02K 41/03*   (2006.01)

(52) U.S. Cl.
USPC .......................................... 310/12.16; 310/25

(58) Field of Classification Search
USPC ........................... 310/25, 12.01, 12.16, 12.33
See application file for complete search history.

(56) References Cited

U.S. PATENT DOCUMENTS

| | | | |
|---|---|---|---|
| 2008/0164771 A1* | 7/2008 | Huang | 310/12 |
| 2011/0062800 A1* | 3/2011 | Tseng et al. | 310/12.16 |
| 2011/0241450 A1* | 10/2011 | Hsu | 310/12.16 |
| 2011/0249352 A1* | 10/2011 | Ku et al. | 359/824 |
| 2012/0008220 A1* | 1/2012 | Lee et al. | 359/822 |
| 2012/0013202 A1* | 1/2012 | Lee | 310/12.16 |
| 2012/0025633 A1* | 2/2012 | Lee et al. | 310/12.16 |
| 2012/0146432 A1* | 6/2012 | Kim et al. | 310/12.16 |
| 2012/0148222 A1* | 6/2012 | Chou | 396/133 |
| 2012/0307140 A1* | 12/2012 | Wang et al. | 348/374 |

* cited by examiner

*Primary Examiner* — Thanh Lam
(74) *Attorney, Agent, or Firm* — Muncy, Geissler, Olds & Lowe, P.C.

(57) ABSTRACT

The present invention provides a voice coil motor comprising a carrier, upper and lower spring plates, magnets, a base and a conductor. The carrier comprises a main body and a coil surrounding said main body. The upper spring plate is provided on the top of the main body and the lower spring plate is provided on the bottom of the main body. The lower spring plate comprises a lower securing portion and a lower actuating portion; the lower actuating portion is adjacent to the bottom of the base. The magnets are arranged outside of the coil; the conductor between the lower spring plate and the base comprises an attachment plate and two conductive legs. The attachment plate is attached to the lower securing portion and the two conductive legs are integrally formed with the attachment plate such that assembly of the voice coil motor is greatly facilitated.

9 Claims, 11 Drawing Sheets

VOICE COIL MOTOR

BACKGROUND OF THE INVENTION

1. Technical Field

The present invention is related to a linear direct current motor, in particular, to a voice coil motor.

2. Description of Related Art

A voice coil motor is a type of linear direct current motor, utilizing permanent magnets and magnetic-field coils to form an actuator having the properties of direct actuation and fixed strokes. The basics of voice coil motor is simple and due to its simplicity in structures, it is particularly suited to the positioning control of short stroke and high precision. One of the common application is the use of such voice coil motor in auto-focus system of a built-in camera in mobile phones.

As the trend is to have lighter and thinner mobile phones, voice coil motors too need to of smaller sizes to be accommodated in such mobile phones. However, as the size of the voice coil motors decreases, the assembly of such motor becomes harder and poses difficulties to manual assembly.

Figure 1:
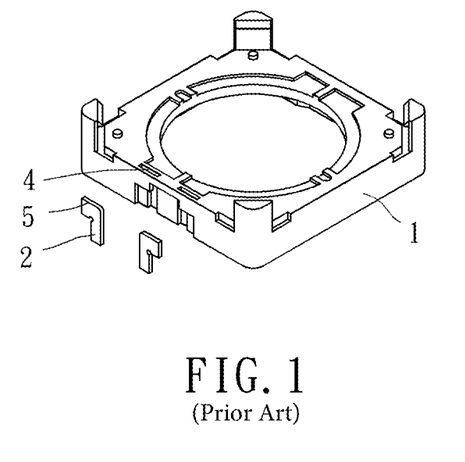
FIG. 1 shows an exploded view of a base of a known voice coil motor.
Figure 2:
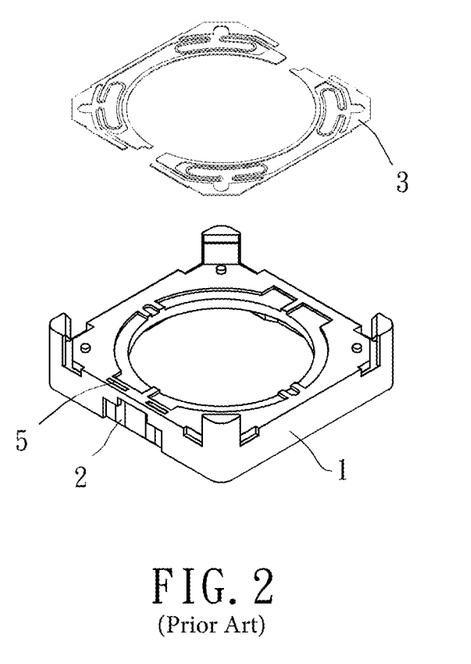
FIG. 2 shows an exploded view of a base and a lower spring plate of a known voice coil motor.

As shown in FIGS. 1 and 2, the structure of a known voice coil motor comprises a base 1, two conductive legs 2 and a conductive spring plate 3. The conductive legs 2 are inserted into the slots 4 on the base 1 manually. However, as the components of conductive legs 2 are small in size, the assembly and manufacturing of such small components are difficult, and if the assembly tolerance becomes greater, the welding between the conductive legs 2 and external power source becomes even more difficult. In addition, since the conductive legs 2 are being welded onto the conducive spring plate 3 with a small area provided by its top surface 5, the manufacturing process is difficult and the defective rate is also high.

Therefore, it can be understood that known coil motors have their drawbacks and downsides in the structural designs to be overcome and improved.

SUMMARY OF THE INVENTION

An objective of the present invention is to provide a voice coil motor that facilitates the assembly and manufacturing thereof.

To achieve the above objective and others, the present invention provides a voice coil motor comprising a carrier, an upper spring plate, a lower spring plate, a plurality of magnets, a base and a conductor. The carrier comprises a main body and a coil surrounding said main body. The main body comprises a top and a bottom, the upper spring plate is provided on the top of the main body, and the lower spring plate is provided on the bottom of the main body. The lower spring plate comprises a lower securing portion, a lower actuating portion and a plurality of connecting sections connected between the lower securing portions and the lower actuating portions. The lower actuating portion is adjacent to the bottom of the main body, the plurality of magnets are arranged on an outer side of the coil and the base is arranged underneath the lower spring plate. The conductor is provided between the lower spring plate and the base and comprises an attachment plate and two conductive legs; the attachment plate is attached to the lower securing portion and the two conductive legs are integrally formed with the attachment plate.

Since the conductive legs of the present invention are integrally formed with the attachment plate and the attachment plate is of a larger area for attachment to the lower securing portion of the lower spring plate, the possibility of having defective connections formed between the conductor and the lower spring plate is reduced. Furthermore, as the conductive legs are integrally formed with the attachment plate, the relative positions of the two conductive legs are fixed and the overall volume of the conductor is greater such that the assembly operation of the voice coil motor of small size by users is facilitated, and the assembly operation can be further improved for the practice of automatic manufacturing to reduce manual costs and increase product yield rates.

DESCRIPTION OF EMBODIMENTS OF THE INVENTION

The following describes a preferred embodiment of the present invention and its structures as well as the improved effects expected to be achieved; it can be understood that the following shall not be treated or considered as the only embodiment of or limitations to the protection or scope of the present invention.

Figure 3:
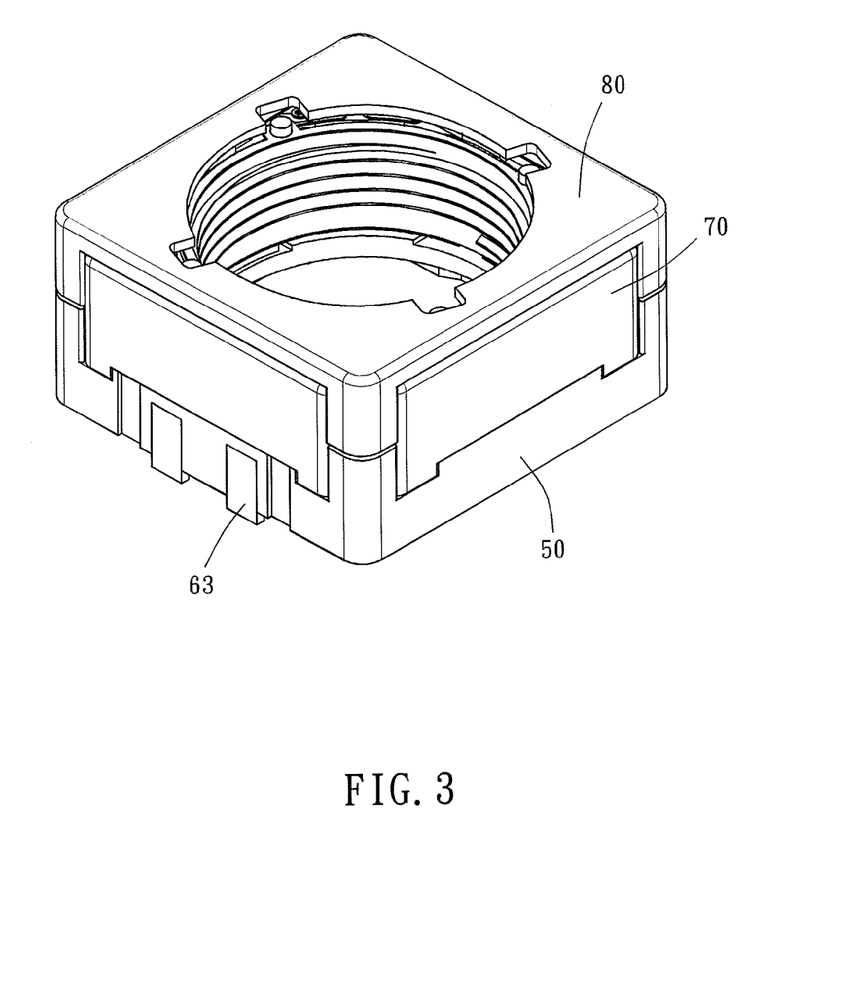
FIG. 3 shows a perspective view of a preferred embodiment of the present invention.
Figure 4:
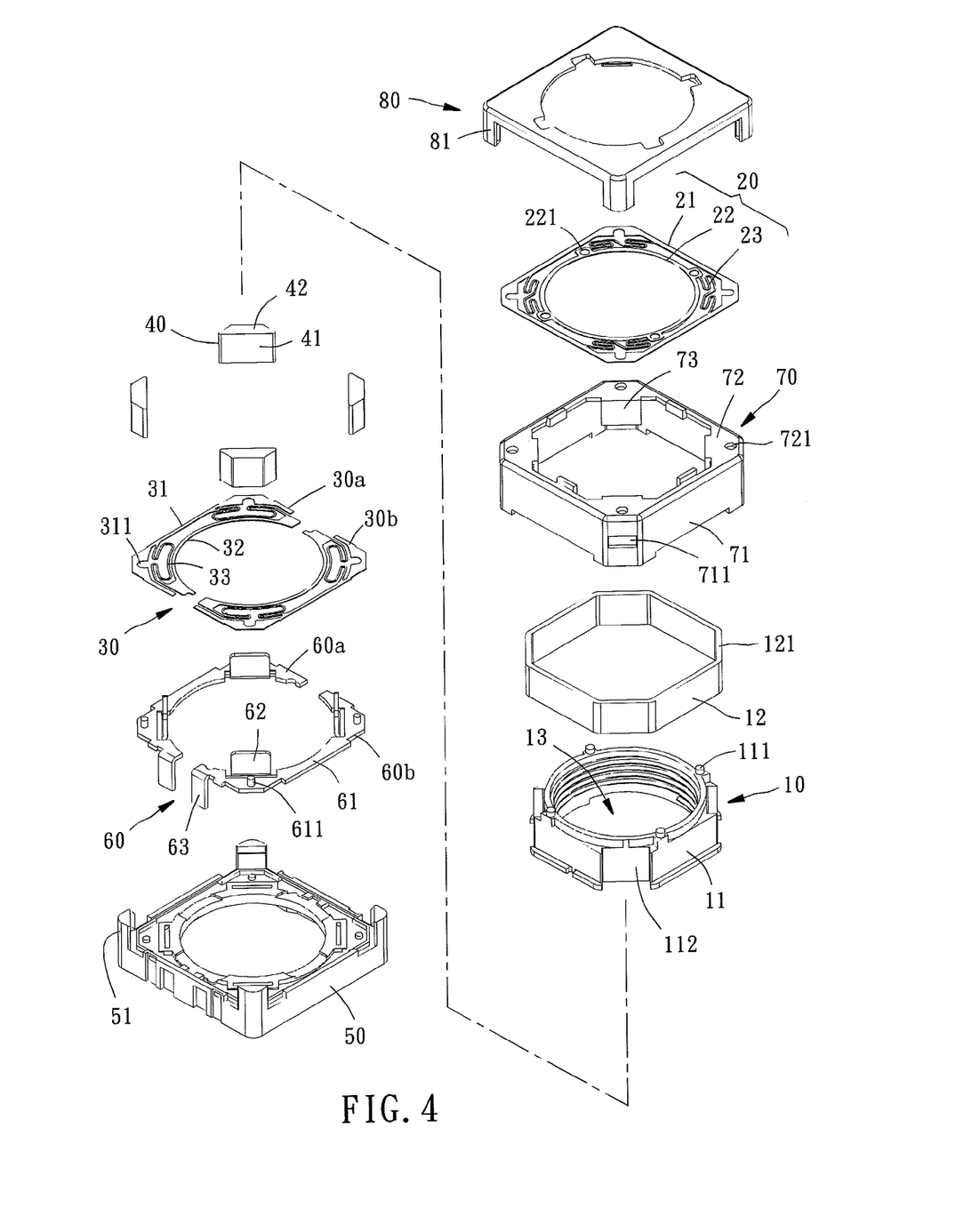
FIG. 4 shows an exploded view of the preferred embodiment of the present invention.

Referring now to FIGS. 3 and 4. In a preferred embodiment of the present invention, a voice coil motor comprises a carrier 10 having a main body 11 and a coil 12 surrounding said main body 11, an upper spring plate 20 provided on the top of said main body 11, a lower spring plate 30 provided on the bottom of said main body 11, a plurality of magnets 40 provided at an outer side of said coil 12, a base 50 provided underneath said lower spring plate 30, and a conductor 60 provided between said lower spring plate 30 and said base 50.

The main body 11 of the carrier 10 is defined with or provided with a fastening hole 13 and the wall of the fastening hole 13 is formed of threads provided for an optical lens set (not shown) to be fastened in the fastening hole 13. Also, as the coil 12 in the magnetic field is conducted, the carrier 10 is then subject to the effect of Lorentz Force to move axially along the coil 12 such that the focal point of the optical lens set can be adjusted. It shall be noted that the terms of "axially" and "radially" recited herein refer to the references of the directions along an axis and a radius respectively.

The upper spring plates 20 and lower spring plates 30 are made of conductive metals, and the upper and lower spring plates 20, 30 and the coil 12 are electrically connected to form a circuit. The lower spring plate 30 comprises a lower securing portion 31, a lower actuating portion 32 and a plurality of connecting portions 33 connected to the lower securing portion 31 and the lower actuating portion 32. The lower actuating portion 32 is adjacent to the bottom of the main body 11 and is electrically connected to the coil 12; wherein the lower spring plate 30 is consisted of two lower spring units 30a, 30b spaced apart from each other, and each one of the lower spring units 30a, 30b comprises said lower securing portion 31, lower actuating portion 32 and lower connecting portion 33. Although the structural configuration of the upper spring plate 20 does not need to be identical to the one of the lower spring plate 30, in the preferred embodiment of the present invention, the upper spring plate 20 is similar to the lower spring plate 30 such that the upper spring plate 20 also comprises an upper securing portion 21, an upper actuating portion 22 and a plurality of upper connecting portions 23 connected between the upper securing portion 21 and the upper actuating portion 22. The upper actuating portion 22 is adjacent to the top of the main body 11 such that as the carrier 10 moves axially, the upper actuating portion 22 or the lower actuating portion 32 is being pushed to exert a spring force to the carrier 10; and in principle, as the spring force is equivalent to the Lorentz Force, the carrier 10 is then being positioned at a specific axial location.

The arrangement of the plurality of magnets 40 allows the coil 12 to be within the magnetic field provided by the magnets 40. The base 50 is made of plastics such that the base 50 is not conductive. The conductor 60 can also be consisted of two conducting units 60a, 60b. Each one of the conducting units 60a, 60b also comprises an attachment plate 61, a plurality of lower magnetic claws 62 protruding upward and two conductive legs 63 provided for electrical connection with an external power source. The attachment plate 61 is attached to the lower securing portion 31 such that the conductor 60 and the lower spring plate 30 are electrically connected. The plurality of lower magnetic claws 62 are arranged between the coil 12 and the main body 11 radially along said carrier 10, and the plurality of lower magnetic claws 62 respectively face the one of the plurality of magnets 40 radially.

Figure 5:
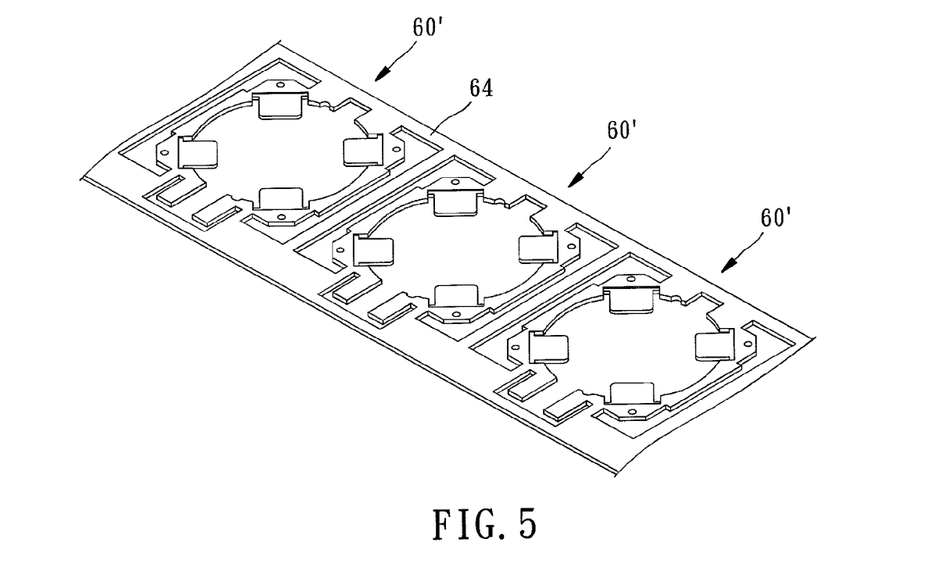
FIG. 5 is an illustration (1) showing the conductor with an feeding belt of the present invention.
Figure 6:
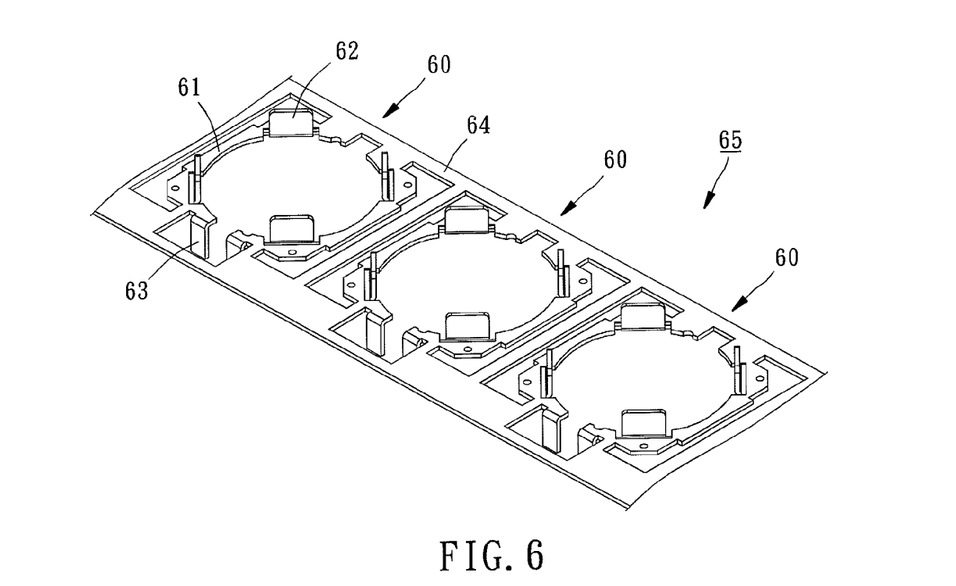
FIG. 6 is an illustration (2) showing the conductor with an feeding belt of the present invention.

As the two conductive legs 63 and the lower magnetic claws 62 are integrally formed with the attachment plate 61, the relative positions of the two conductive legs 63 are fixed such that the overall volume of the conductor 60 is increased and the manufacturing is facilitated to be of less difficulties. Also, the assembly process of the conductor 60 and the base 50 can therefore be applicable to automatic manufacturing machineries, detailed below:

As shown in FIG. 5, the manufacturing of the conductor 60 can be formed from pressing of a metal plate without the cut outs of unnecessary structures to form a plurality of conductor prototypes 60' with a feeding belt. The plurality of conductor prototypes 60' are connected to each other and positioned via a connection belt 64. Then, as shown in FIG. 6, second pressing can made performed on the feeding belt such that the lower magnetic claws 62 and conductive legs 63 of the conductor prototype 60' are bent toward the predetermined directions and such that the lower magnetic claws 62 and the conductive legs 63 are integrally formed with the attachment plate 61, forming a feeding belt 65 connecting a plurality of conductors 60 via the connection belt 64.

Figure 7:
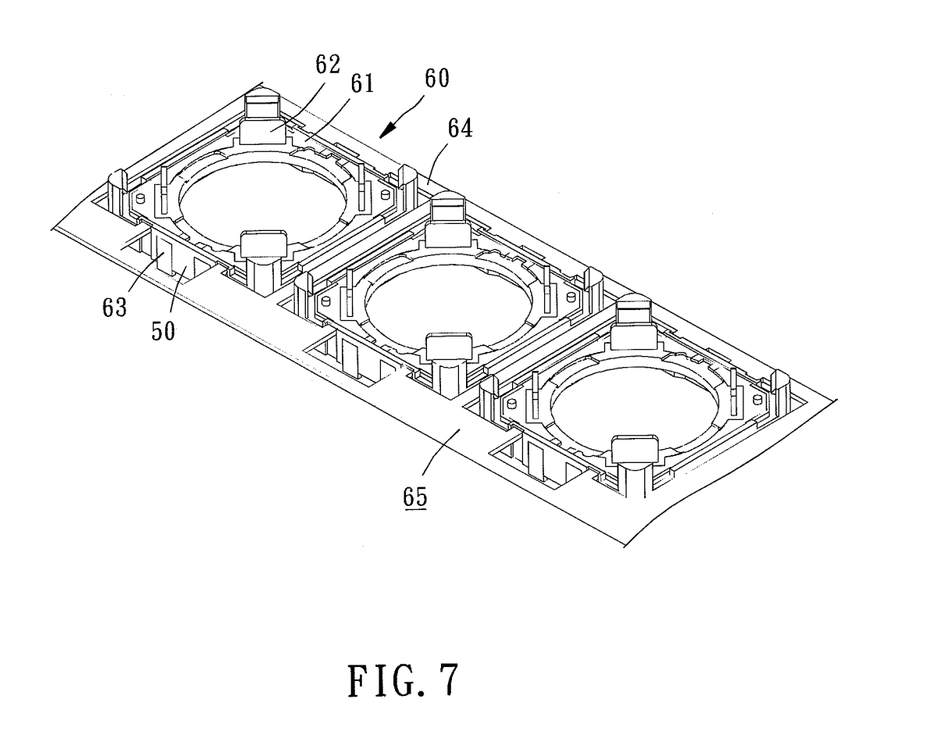
FIG. 7 is an illustration showing the conductor with an feeding belt combined with the base of the present invention.

Afterward, by ways of injection molding, the abovementioned feeding belt 65 cooperates with molds (not shown) of the base 50 to secure a plurality of the bases 50 directly onto the feeding belt 65 having a plurality of conductors 60 thereon, which is then followed by the cut outs of the connection belt 64 such that individual and independent base 50 and conductor 60 assembled structures are formed. Such manufacturing method of assembling the base 50 and the conductor 60 can therefore greatly reduce man power for high speed and mass productions, and the human errors of assembling small component parts can be reduced to increase the production yield rate.

Figure 8:
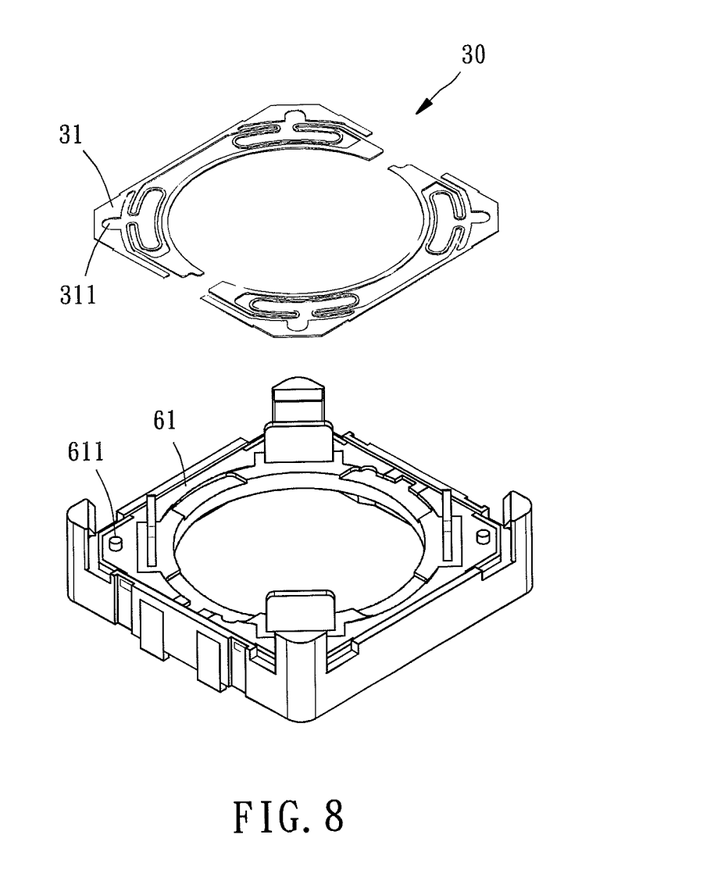
FIG. 8 is an illustration (1) showing the lower spring plate assembled onto the base and the conductor of the present invention.
Figure 9:
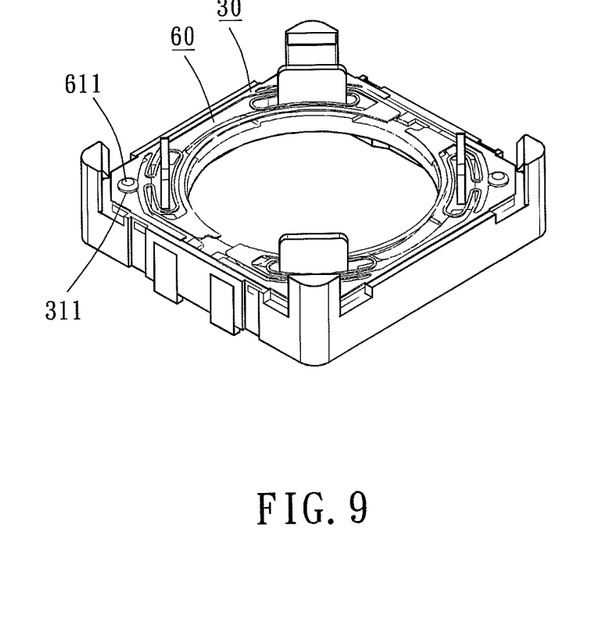
FIG. 9 is an illustration (2) showing the lower spring plate assembled onto the base and the conductor of the present invention.

In order to increase the combinational stability of the conductor 60 and the lower spring plate 30, despite that the two can be welded together for securement, they can be configured as shown in FIG. 8. The attachment plate 61 is formed of a plurality of riveting columns 611 protruding upward, and the lower securing portion 31 of the lower spring plate 30 is formed of a plurality of holes 311 provided for the riveting columns to pass therethrough. As shown in FIG. 9, the riveting columns are being deformed due to external pressure such that they are secured on an outer edge of the hole 311 to secure the lower spring plate 30 and said conductor 60 by riveting.

Referring now to FIGS. 3 and 4. The voice coil motor of the present invention further comprises a magnetized shell 70. The magnetized shell 70 comprises a side frame 71 in a ring form, a plurality of top covering plate 72 corresponding to said plurality of magnets 40 and a plurality of upper magnetic claws 73 protruded downward from said top covering plates 72. The side frame 71 is formed of a plurality of notches 711 and the base 50 comprises a plurality of lower hooks 51 respectively secured onto said plurality of notches 711 such that the relative position between the magnetized shell 70 and the base 50 is secured.

Figure 10:
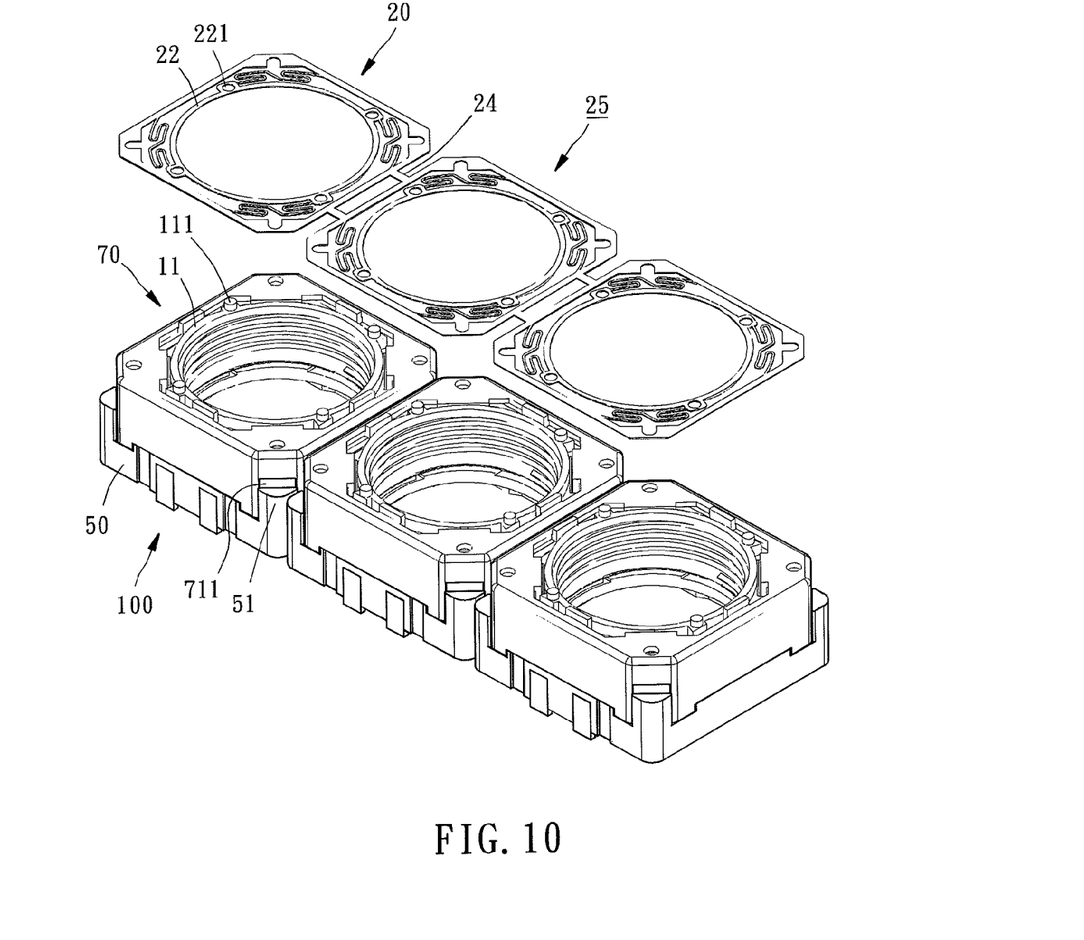
FIG. 10 is an illustration (1) showing the upper spring plate with an feeding belt assembled in a semi-finished product of the voice coil motor of the present invention.
Figure 11:
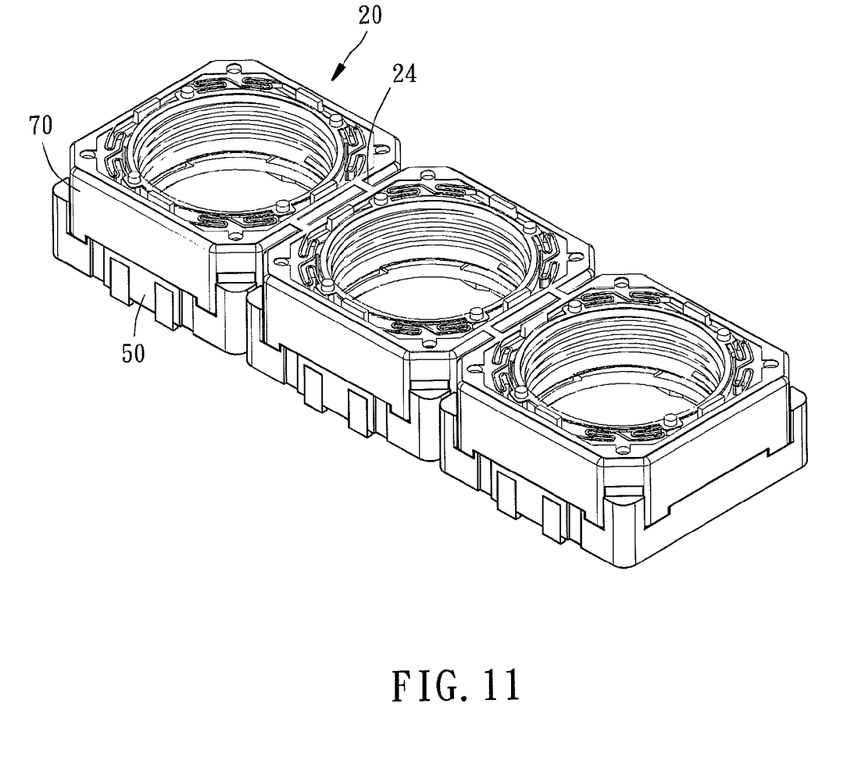
FIG. 11 is an illustration (2) showing the upper spring plate with an feeding belt assembled in a semi-finished product of the voice coil motor of the present invention.

In the preferred embodiment of the present invention, the upper securing portion 21 of the upper spring plate 20 is secured to a top surface of the top covering plate 72; in other words, it is secured to an outer side of the magnetized shell 70 rather than to an inner side thereof. Such design facilitates the assembly process of the upper spring plate 20, detailed below:

As shown in FIG. 10, a feeding belt 25 is formed by the connection belt 24 connecting a plurality of upper spring plate 20; wherein the appearance of the connection belt 24 is not limited to the shape shown in the figure. The feeding belt 25 can be made from pressing and the upper actuating portion is formed of holes 221. The top of the main body 11 of the carrier 10 is formed of a plurality of columns 111. The feeding belt 25 can be assembled with a plurality of semi-finished voice coil motor 100 such that the columns 111 pass through the holes 221 to position the upper spring plate 20 thereon, forming an assembled structure as shown in FIG. 11. The connection belt 24 can then be cut out to separate each one of the plurality of upper spring plates 20 and the assembly process of the upper spring plates 20 is completed.

The abovementioned assembly process is characterized in that the magnetized shell 70 is arranged underneath the upper spring plate 20, and the magnetized shell 70 is pre-assembled with the base 50 to position the carrier 10, lower spring plate 30, magnets 40 and conductor 60, such that the upper spring plate 20 can be assembled by means of the feeding belt 25 in separated lots or groups and such that the production rate can therefore be increased and the trouble or difficulty associated with the assembly and positioning of the upper spring plates 20 one by one is prevented.

Figure 12:
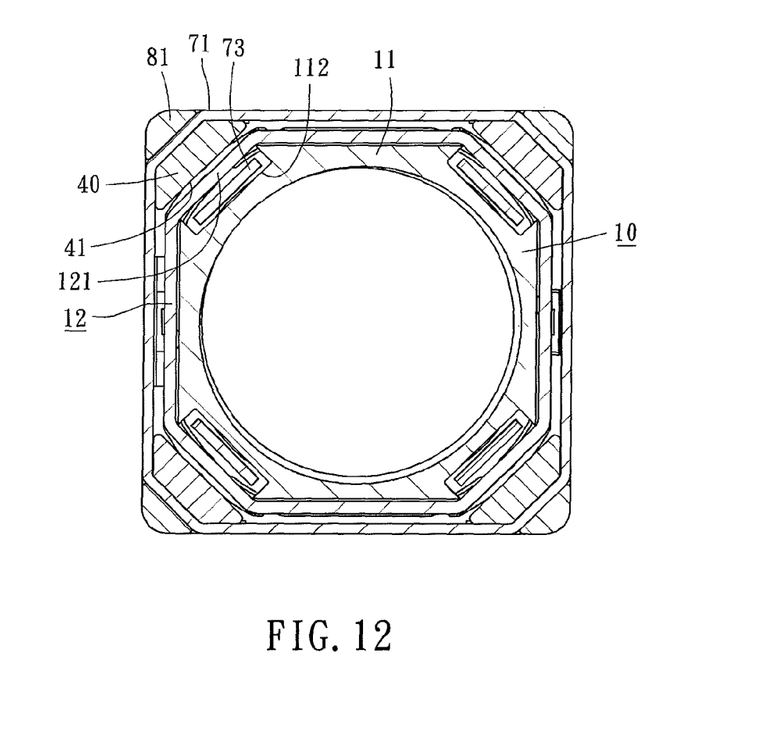
FIG. 12 shows a laterally sectioned view of the preferred embodiment of the present invention.
Figure 13:
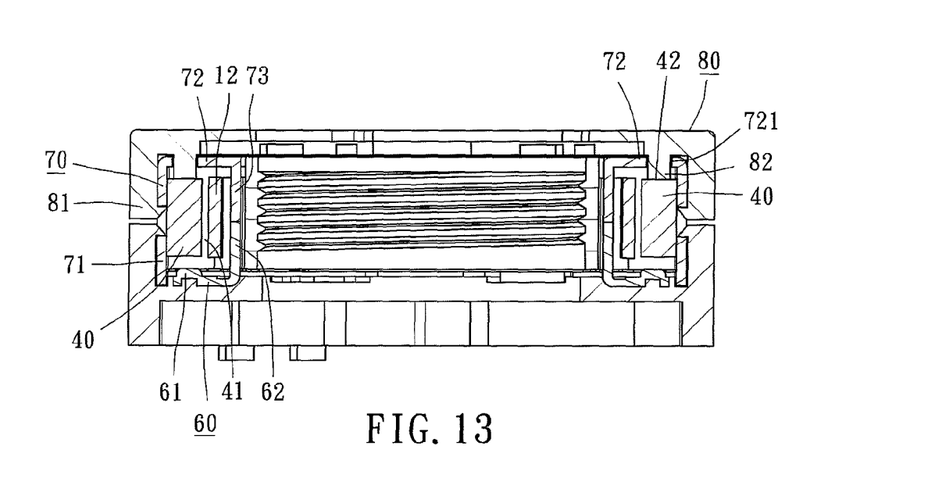
FIG. 13 shows a longitudinally sectioned view of the preferred embodiment of the present invention.
Figure 14:
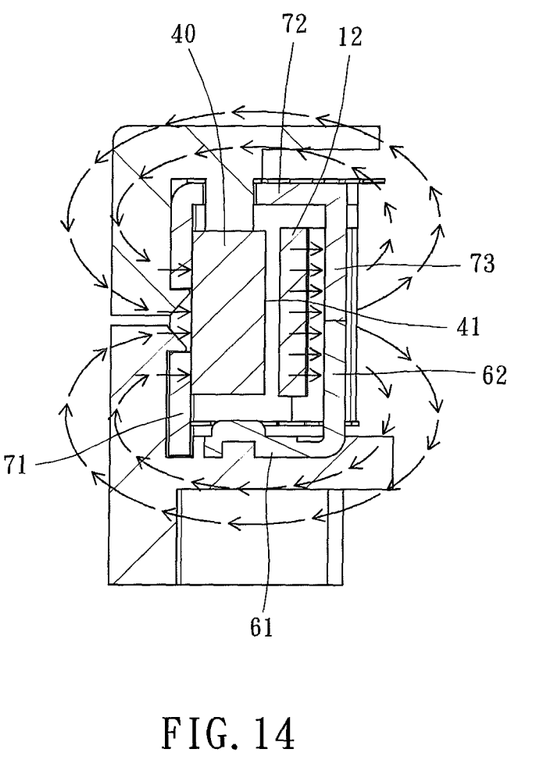
FIG. 14 is an illustration showing magnetic flux fields of directions of the preferred embodiment of the present invention.

Referring now to FIGS. 12, 13. In order to increase the utilization of the magnetic flux, in the preferred embodiment of the present invention, the lower edge of the side frame 71 of the magnetized shell 70 is arranged adjacent to the attachment plate 61 of the conductor 60, and the upper magnetic claws 73 are arranged at the inner side of the side frame 71 and respectively aligned with one of the lower magnetic claws 62 such that a magnetic flux space is defined by the side frame 71, top covering plate 72, attachment plate 61 and upper and lower magnetic claws 73, 62. The magnets 40 and the coil 12 are therefore received within the magnetic flux space, forming a closed magnetic flux circuit as shown in FIG. 14. The utilization of the magnetic flux is then maximized and is of the properties of low magnetic resistance, magnetic leakage and high excitation of magnetism.

Also, as shown by FIGS. 12 and 14, in order to provide a magnetic field of a more uniform magnetic flux density, each one of the magnets 40 comprises a north-pole surface 41; in other words, the north-pole is a flat surface. Each one of the plurality of upper magnet claws 73 and correspondingly aligned lower magnetic claws 62 are of flat surfaces parallel to said north-pole surface 41, and the coil 12 comprises a plurality of operating sections 121 between said plurality of magnets 40 and said upper and lower magnetic claws 73, 62 and each one of said operating sections 121 is parallel to said north-pole surface 41 correspondingly such that a uniform magnetic field is formed between the magnets 40 and the upper and lower magnetic claws 73, 62. The coil 12 is therefore always maintained within the uniform magnetic field during the axial movements of the carrier 10 such the force constant ($K_f$, the product of length of the conductive wire and the magnetic flux density) is maintained at a certain value, facilitating the operation control of the voice coil motor.

In addition, in the preferred embodiment of the present invention, the arrangement of the upper and lower magnetic claws 73, 62 is configured to not only provide for magnetic conductivity but also to cooperate with a plurality of axially extended slots 112 formed on the main body 11. As shown in FIG. 12, each one of the slots 112 receives one of the upper magnetic claws 73 and the corresponding lower magnetic claws 62 therein such that the rotation of the carrier 10 is prevented or the degree of rotation thereof is at least greatly reduced.

Referring now to FIGS. 4 and 13. In order to prevent dust and to secure the relative positions of the components, the voice coil motor of the preferred embodiment of the present invention further comprises a dust cover 80 provided on top of said magnetized shell 70. The dust cover 80 comprises a plurality of upper hooks 81 protruding downward to secure to the notches 711 of the magnetized shell 70. The upper spring plate 20 is arranged between the dust cover 80 and the magnetized shell 70. In addition, the dust cover 80 further comprises a plurality of positioning columns 82 protruding downward, and the top covering plates 72 are formed of plurality of through holes 721 respectively provided for the plurality of positioning columns 82 to pass therethrough. The plurality of positioning columns 82 are respectively attached to the top surface 42 of one of the magnets 40 such that a gap is provided between the top surface 42 of each one of the magnets 40 and the top covering plates 72, facilitating the positioning of the magnets 40 in the axial directions thereof.

In view of the above, the voice coil motor of the present invention is of improvements in the assembly and manufacturing of the voice coil motor and also in the operation controls thereof. Therefore, the present invention provides a voice coil motor of great economic benefits while satisfying the needs of the industry.

What is claimed is:

1. A voice coil motor, comprising:
a carrier, having a main body and a coil surrounding said main body; said main body having a top and a bottom;
an upper spring plate, provided on said top of said main body;
a lower spring plate, provided on said bottom of said main body; said lower spring plate having a lower securing portion, a lower actuating portion and a plurality of connecting sections connected between said securing portion and said lower actuating portion; said lower actuating portion arranged adjacent to said bottom of said main body;
a plurality of magnets, provided at an outer side of said coil;
a base, provided underneath said lower spring plate;
a conductor, provided between said lower spring plate and said base; said conductor comprising an attachment plate and two conductive legs; said attachment plate attached to said lower securing portion and said two conductive legs being integrally formed with said attachment plate.

2. The voice coil motor as claimed in claim 1, further comprises a magnetized shell comprising a side frame in a ring form, a plurality of top covering plate corresponding to said plurality of magnets and a plurality of upper magnetic claws protruded downward from said top covering plates, said attachment plate further comprises a plurality of lower magnetic claws protruding upward, said lower magnetic claws are integrally formed with said attachment plate, said plurality of lower magnetic claws are arranged between said coil and said main body radially along said carrier, and said plurality of lower magnetic claws respectively face one of said plurality of magnets radially, a lower edge of said side frame is adjacent o an outer edge of said attachment plate, said plurality of upper magnetic claws is arranged at an inner side of the side frame and respectively aligned with each one of said magnetic claws; a magnetic-flux space is defined by said top covering plate, said attachment plate and said upper and lower magnetic claws, said plurality of magnets and said coil are received within said magnetic-flux space.

3. The voice coil motor as claimed in claim 2, wherein each one of said plurality of magnets comprises a north-pole surface, each one of said plurality of upper magnetic claws and correspondingly aligned lower magnetic claws are of flat surfaces parallel to said north-pole surface; said coil comprises a plurality of operating sections between said plurality of magnets and said upper and lower magnetic claws, each one of said operating sections is parallel to said north-pole surface correspondingly.

4. The voice coil motor as claimed in claim 2, wherein said main body comprises a plurality of axially extended slots, said each one of said plurality of slots is provided to receive one of said plurality of upper magnetic claws and corresponding lower magnetic claws therein.

5. The voice coil motor as claimed in claim 2, further comprises, a dust cover provided on top of said magnetized shell, said upper spring plate is arranged between said dust cover and said magnetized shell, said dust cover comprises a plurality of positioning columns protruding downward, said plurality of top covering plates are formed of plurality of through holes respectively provided for said plurality of positioning columns to pass therethrough, said plurality of positioning columns are respectively attached to a top surface of one of said magnets such that a gap is provided between said top surface of each one of said magnets and said top covering plates.

6. The voice coil motor as claimed in claim 5, wherein said dust cover further comprises a plurality of upper hooks protruding downward, said side frame of said magnetized shell is formed of a plurality of notches provided for said upper hooks to secure thereon.

7. The voice coil motor as claimed in claim 6, wherein said base comprises a plurality of lower hooks secured onto said plurality of notches.

8. The voice coil motor as claimed in claim 2, wherein said upper spring plate comprises an upper securing portion, an upper actuating portion and a plurality of upper connecting sections connected between said upper securing portion and said upper actuating portion, said upper securing portion is secured to said top surface of said top covering plate, and said upper actuating portion is adjacent to said top of said main body.

9. The voice coil motor as claimed in claim 1, wherein said attachment plate is formed of a plurality of riveting columns protruding upward, said lower securing portion is formed of a plurality of holes provided for said riveting columns to pass therethrough, said riveting columns are configured to deform under external pressure to secure said lower spring plate and said conductor by riveting.

* * * * *